United States Patent [19]

Richmond

[11] Patent Number: 5,101,311
[45] Date of Patent: Mar. 31, 1992

[54] TAPE AND MECHANISM PROTECTION METHODS FOR DAT DRIVES

[75] Inventor: Robert C. Richmond, Laguna Hills, Calif.

[73] Assignee: Archive Corporation, Costa Mesa, Calif.

[21] Appl. No.: 435,008

[22] Filed: Nov. 9, 1989

[51] Int. Cl.$^5$ .................. G11B 15/18; G11B 17/00; G11B 19/02

[52] U.S. Cl. .................. 360/69; 360/74.1; 360/71

[58] Field of Search .................. 360/69.71, 72.1, 72.2, 360/73.03, 74.1, 32, 84, 74.4; 369/19

[56] References Cited

U.S. PATENT DOCUMENTS

| | | | |
|---|---|---|---|
| 4,622,598 | 11/1986 | Doi et al. | 360/22 |
| 4,622,600 | 11/1986 | Okamoto et al. | 360/32 |
| 4,700,255 | 10/1987 | Mitsuhashi | 360/74.1 |
| 4,701,813 | 10/1987 | Miyake et al. | 360/71 |
| 4,717,968 | 1/1988 | Painton et al. | 360/74.1 |
| 4,745,298 | 5/1988 | Iwamatsu | 307/38 |
| 4,833,549 | 5/1989 | Yoshimoto et al. | 360/191 |

FOREIGN PATENT DOCUMENTS

0322167  6/1989  European Pat. Off. .

OTHER PUBLICATIONS

DAT (Digital Audio Tape Recorder), Chairperson: T. Shimada, 1986 IEEE International Conference on Consumer Electronics, Jun. 4, 1986, Digest of Technical Papers, p. 41.

"The Dat Conference: Its Activities and Results," H. Hakajima, M. Kosada, 1986 IEEE International Conference on Consumer Electronics, Jun. 4, 1986, Digest of Technical Papers, pp. 42-43.

"Digital Signal Processing Technology for R-Dat," T. Arai, T. Noguchi, M. Kobayashi, H. Okamoto, 1986 IEEE International Conference on Consumer Electronics, Jun. 4, 1986, Digest of Technical Papers, pp. 44-45.

"Magnetic Recording Characteristics of R-Dat," N. Ohtake, M. Isshiki, E. Endoh, T. Kotoh, 1986 IEEE International Conference on Consumer Electronics, Jun. 4, 1986, Digest of Technical Papers, pp. 46-47.

"Servo Technology of R-Dat," A. Hitomi, T. Taki, 1986 IEEE International Conference on Consumer Electronics, Jun. 4, 1986, Digest of Technical Papers, pp. 48-49.

"Format of Pre-Recorded R-Dat Tape and Results of High Speed Duplication," K. Odaka, T. Nagaki, N. Horikawa, 1986 IEEE International Conference on Consumer Electronics, Jun. 4, 1986, Digest of Technical Papers, pp. 50-51.

"Magnetic Tape and Cartridge of R-Dat," F. Itoh, H. Shiba, M. Hayama, T. Satoh, 1986 IEEE International Conference on Consumer Electronics, Jun. 4, 1986, Digest of Technical Papers, pp. 52-53.

"The DAT Conference. Its Activities and Results," H. Nakajima, M. Kosaka, IEEE Transactions on Consumer Electronics, vol. CE-32, No 3, Aug. 1986, pp. 404-415.

"Digital Signal Processing Technology for R-DAT," T. Arai, T. Noguchi, M. Kobayashi, H. Okamoto,

(List continued on next page.)

Primary Examiner—David J. Severin
Assistant Examiner—Alfonso Garcia
Attorney, Agent, or Firm—Roberts and Quiogue

[57] ABSTRACT

A technique for protecting the tape and mechanism of a DAT tape drive that includes engaging a PAUSE mode of operation, wherein the reel motors are off and the tape is stationarily positioned at a predetermined location, when the drive is not able to record or read a data group. If the amount of time during which the PAUSE mode is engaged exceeds a predetermined PAUSE mode limit, a STOP mode of operation, wherein the reel motors remain off and the pinch roller is disengaged from the tape and capstan, is engaged. If the amount of time during which the STOP mode is engaged exceeds a predetermined STOP mode limit, the tape is unloaded.

8 Claims, 4 Drawing Sheets

OTHER PUBLICATIONS

IEEE Transactions on Consumer Electronics, vol. CE-32, No. 3, Aug. 1986, pp. 416–424.

"Servo Technology of R-DAT," A. Hitomi, T. Taki, IEEE Transactions on Consumer Electronics, vol. CD-32, No 3, Aug. 1986, pp. 425–431.

"DAT Digital Audio Tape, Specifications, Products and Future Applications," R. A. Finger, Matsushita Technology Center, New Jersey, May 21, 1987.

The Dat Conference Standard, Digital Audio Taperecorder System, "DAT Digital Audio Tape," The DAT Conference, c/o Electronic Industries Association of Japan, Engineering Department, Tokyo Chamber of Commerce & Industry Bldg., 2-2, 3-chome, Marunouchi, Chiyoda-ku, Tokyo 100, Japan, Jun., 1987.

"All Present and Correct," E. Tan and M. Dunstan, Systems International, Feb. 1988, Reed Business Publishing, Quadrant, Sutton, Surrey SM2 5AS.

"DAT Data Format Takes Shape," P Bramhall and M. Dunstan, Systems International, Mar., 1988, Reed Business Publishing, Quadrant, Sutton, Surrey SM2 5AS.

"DAT for Data," J. Young, E. Tan, Systems Internatioanl, Reed Business Publishing, Quadrant, Sutton, Surrey SM2 5AS.

"Designing a Data Storage Format for Digital Audio Tape (DAT)–Preliminary Draft-Revision 0.1," K. Odaka, E. T. Tan, B. Vermeulen, Preliminary Draft, Revision 0.1, Aug. 25, 1988.

"Isn't DAT Special?" B. Vermeulen and M. Law, Mini--Micro Systems, Dec. 1988, pp. 84–89.

"Digital Audio Tape for Data Storage," E. Tan and B. Vermeulen, IEEE Spectrum, Oct. 1989, pp. 34–38.

3rd Draft-Proposed American National Standard Helical-Scan Digital Computer Tape Cartridge 3.81 mm (0.150 in) for Information Interchange, Jan. 31, 1989.

5rd Draft-Proposed American National Standard Helical-Scan Digital Computer Tape Cartridge 3.81 mm (0.150 in) for Information Interchange, Oct. 31, 1990.

7rd Draft-Proposed American National Standard Helical-Scan Digital Computer Tape Cartridge 3.81 mm (0.150 in) Digital Data Storage (DDS) Recorded Format for Information Interchange, Apr., 1991.

TAPE AND MECHANISM PROTECTION METHODS FOR DAT DRIVES

BACKGROUND OF THE INVENTION

The disclosed invention is directed generally to computer data storage digital audio tape (DAT) drives, and is directed more particularly to recording and reading techniques for computer data storage DAT drives that avoids excessive contact between the read and record heads and the tape.

Digital audio tape (DAT) technology, which was developed for audio programming, has been adapted for storage of computer data. An example of a format for the storage of computer data utilizing DAT technology is the American National Standards Institute (ANSI) Digital Data Storage (DDS) standard, presently in draft form ("PROPOSED AMERICAN NATIONAL STANDARD HELICAL-SCAN DIGITAL COMPUTER TAPE CARTRIDGE 381 mm (0.150 in) FOR INFORMATION INTERCHANGE," ASC X3 Project No. 668-D).

The characteristics that have made DAT technology attractive for computer data storage include its high capacity, high transfer rate capability, relatively small media size and low media cost, and the adaptability of the DAT technology to conform with personal computer storage device form factors including the 5-¼ and 3-½ inch forms.

As is well known, a DAT drive utilizes helical scanning pursuant to which a plurality of read and record heads are positioned appropriately on a cylinder that is tilted at a small angle relative to the travel path of the tape which is wrapped around a portion of the circumference of the cylinder. In operation, the cylinder is rotated at a relatively high rate while the tape is moved a relatively low rate. Ultimately, as a result of the relative motion of the recording heads and the tape, the read and record heads traverse tracks that are slanted or oblique relative to the longitudinal direction of the tape. The appropriate heads record and read such slanted tracks.

For digital data storage applications of DAT technology, for example, pursuant to the ANSI DDS standard, data is commonly stored in data groups respectively comprising 23 or 22 frames, where each frame includes 2 tracks. Typically, a data group includes about 126 Kbytes of information, as well as management information such as error correction information. In order to avoid the inertia and mechanical wear in starting and stopping the mechanical elements of a DAT drive and to increase throughput and for purposes of error correction, data is commonly written to and read from the tape in groups (i.e., a one group minimum) with the use of appropriate buffer management techniques.

A straightforward procedure for recording data with a computer storage DAT drive would be to record a complete group or groups to the extent available for recording without stopping the tape, and then repositioning the tape to be ready for the next group. Tape repositioning is necessary due to the tape drive mechanism inertia that prevents stopping the tape instantaneously. While the tape is being held in position ready for writing, the head cylinder continues to rotate, the tape remains tensioned and wrapped against the head cylinder, and the pinch roller remains engaged. A consideration with such procedure, however, is the continued abrasion of the heads against an area of the tape that was just recorded, and also tape damage from the pinch roller being engaged while the tape is stationary.

A straightforward procedure for reading data with a computer storage DAT drive would be to read a complete group or groups as can be buffered without stopping the tape, and then reposition the tape to be ready for the next group. While the tape is being held in position ready for reading, the head cylinder continues to rotate, the tape remains tensioned and wrapped against the head drum, and the pinch roller remains engaged. A consideration with such procedure, however, is the continued abrasion of the heads against the tensioned tape, and potential tape damage due to the pinch roller being engaged while the tape is stationary.

Techniques have been developed for retracting the tape from the head cylinder (commonly called "unloading" the tape) after a predetermined interval during which the tape has been kept stationary. Considerations with such technique, however, include the possibility of power being turned off while the tape is in the unload mode, which would prevent the recording of any partial data group that might have been buffered and also prevent the recording of an appropriate End of Data marker. In addition to being incomplete, such tape would be incorrectly formatted. Another consideration is that during the predetermined interval the tape continues to be tensioned against the rotating head cylinder, and the pinch roller remains engaged which presents the possibility of tape creasing.

SUMMARY OF THE INVENTION

It would therefore be an advantage to provide a computer storage DAT drive record and read process that reduces tape and head wear. Excessive tape wear can lead to loss of recorded data.

Another advantage would be to provide a computer storage DAT drive record and read process that reduces tape and head wear and does not introduce substantial delays in data throughput.

A further advantage would be to provide a computer storage DAT drive record and read process that reduces mechanical wear and does not introduce substantial delays in data throughput.

The foregoing and other advantages are provided by the invention in a method that includes the steps of engaging a PAUSE mode of operation when data is not being read or recorded, wherein the tape reel motors are turned off so that tape tension is relaxed, and the tape is stationarily positioned at a location that depends on whether the drive is in the record or read mode. If the drive is in the record mode, the tape is stationarily positioned so that the tape heads traverse an area of the tape that is ahead of the data that was just recorded. If the drive is in the read mode, the tape is stationarily positioned so that the tape heads traverse an area of the tape that is behind the data that is next in sequence to the data that was just read.

If the amount of time the PAUSE mode is engaged without any data being recorded or read exceeds a predetermined PAUSE mode limit, a STOP mode is engaged wherein the pinch roller is disengaged from the tape and capstan.

While either the PAUSE mode or STOP mode is engaged, a determination is repeatedly made as to whether data can be recorded or read, and if so, the data is recorded or read.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

Figure 1:
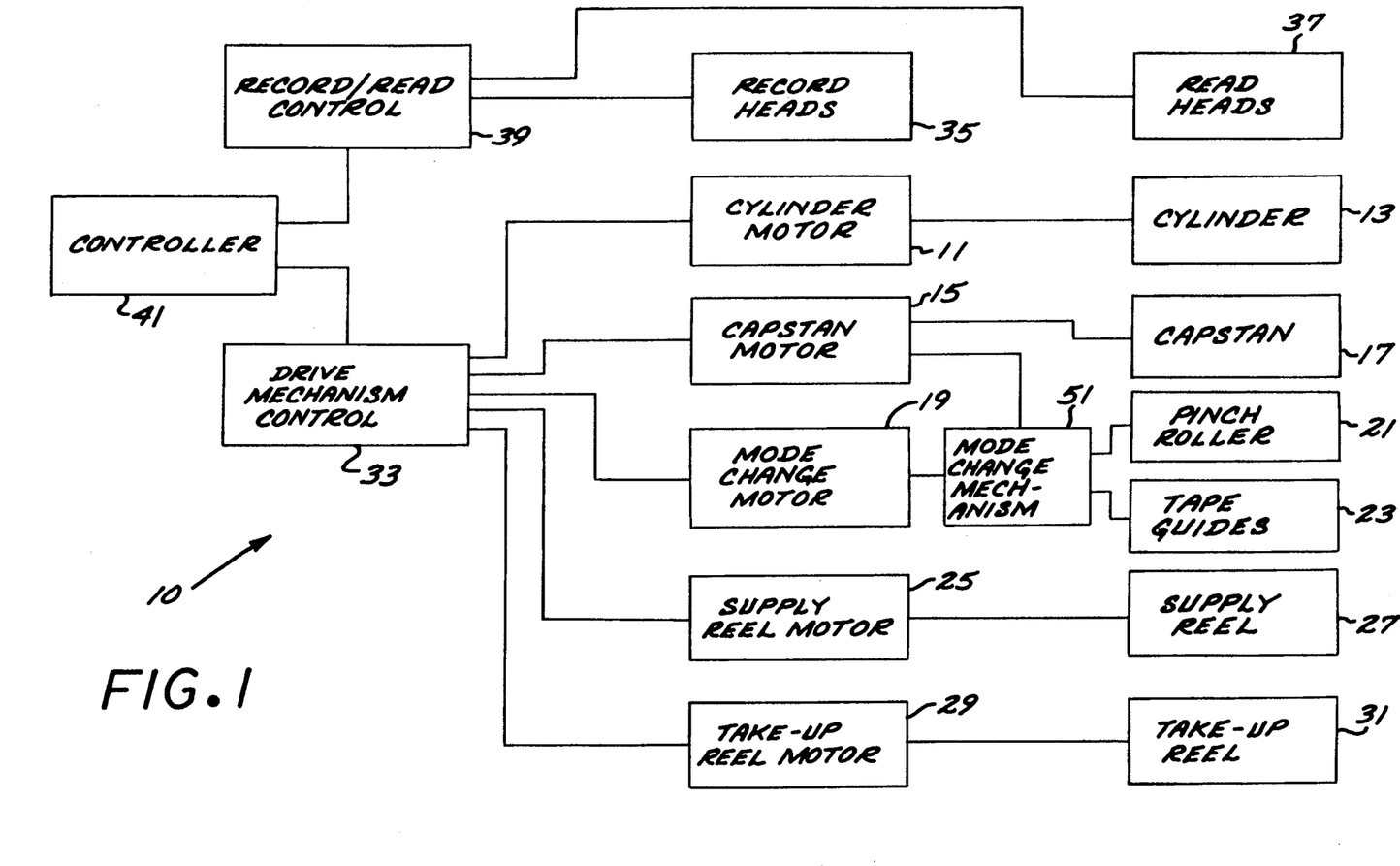
FIG. 1 is a generalized block diagram of the major components of a DAT drive with which the subject invention can be utilized.

Referring now to FIG. 1, shown therein is a generalized block diagram of the pertinent components of a digital audio tape (DAT) drive 10 with which the invention is utilized. The DAT drive 10 includes a cylinder motor 11 for rotating the head cylinder 13, and a capstan motor 15 for driving a tape capstan 17. A pinch roller 21 for pressing the tape against the capstan and tape guides 23 for wrapping the tape against the head cylinder 13 are actuated by the capstan motor 15 via a mode change mechanism 51 which is controlled by a mode change motor 19. In particular, the mode change mechanism 51 changes the mechanical coupling of the capstan motor 19 to the pinch roller 21 and tape guides 23 in response to the mode change motor 19. Alternatively, the pinch roller 21 and the tape guides 23 could be directly controlled by a mode change motor.

The DAT drive further includes a supply reel motor 25 for rotating a tape supply reel 27 and a take-up reel motor 29 for rotating a tape take-up reel 31. As is well known in the art, the supply and take-up reel motors are controlled to tension the tape. A drive mechanism control circuit 33, which, for example, can be microprocessor based, controls and drives the foregoing motors.

The DAT system 10 also includes record heads 35 and read heads 37 supported by the tape head cylinder 13, as well as a record/read control circuit 39, which, for example, would include record and playback amplifiers, a modulator and a demodulator, and circuitry for processing the DAT format. A controller 41 provides overall control of the drive mechanism control circuit 33 and the record/read control circuit 39.

Figure 2:
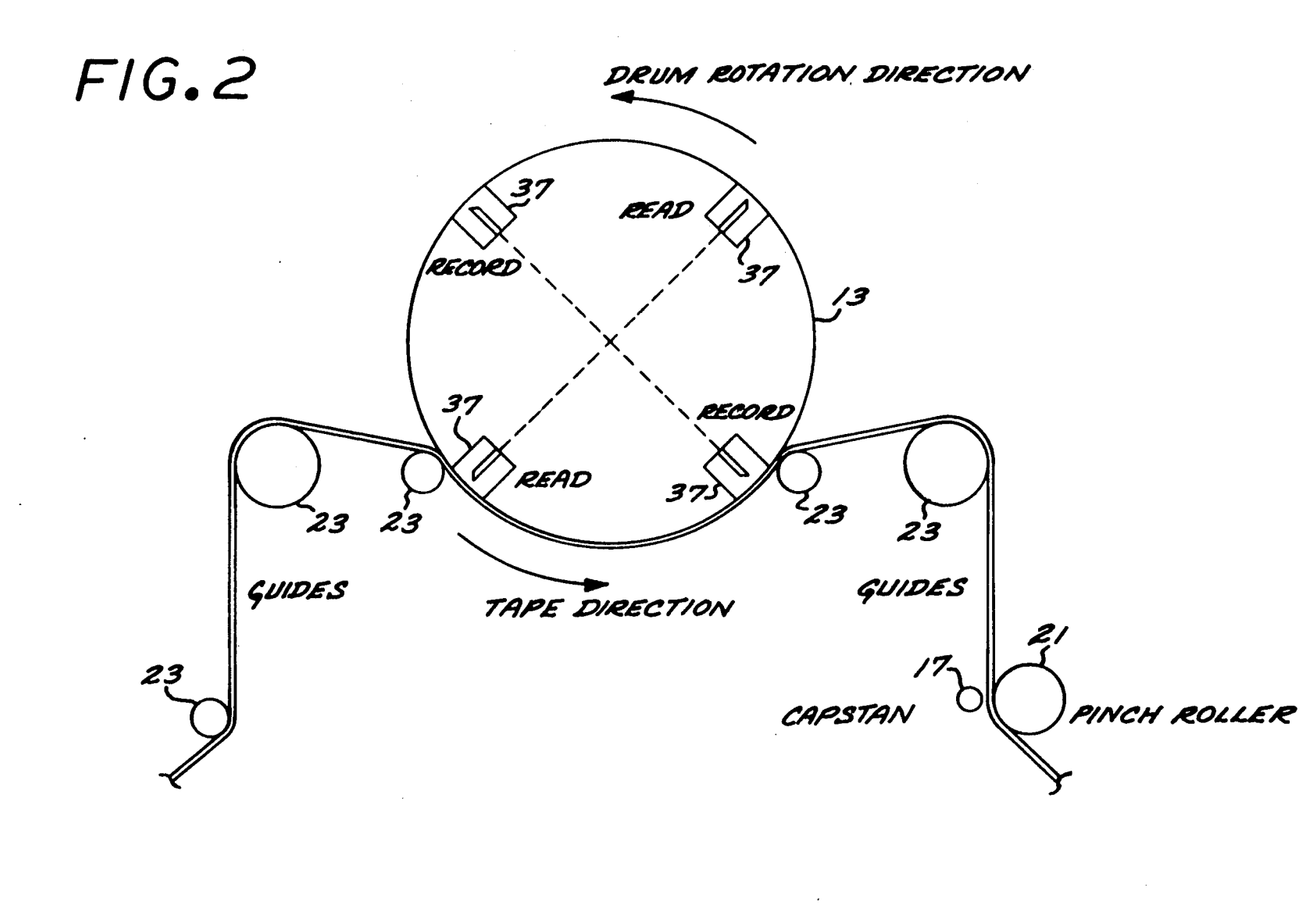
FIG. 2 is a schematic top plan view depicting the tape path of the DAT drive of FIG. 1.

Referring now to FIG. 2, set forth therein is a schematic top plan view depicting the pertinent tape path defined by tape guides, head cylinder, capstan, and pinch roller of the DAT drive.

For computer data storage and retrieval, the DAT drive 10 records and reads data pursuant to known data formatting techniques in data increments of predetermined size, for example, data groups wherein each data group includes 22 or 23 frames, and each frame comprises 2 tracks. Pursuant to such formatting, only complete data groups are recorded or read. Buffer management techniques are utilized to achieve the appropriate formatting, wherein a data buffer is utilized to store data for writing or pursuant to reading.

In accordance with the invention, the mechanism of the DAT drive 10 is controlled to be in different modes or states of operation, depending on whether data is being written or read, and the length of time for which the tape has not been moved for recording or reading. The following sets forth a summary of the different modes of operation that are available when writing or reading is not occurring and the tape is stationary.

|  | UN-LOADED | STOP | PAUSE | LOADED |
|---|---|---|---|---|
| CAPSTAN MOTOR | OFF | OFF | OFF | ON or OFF |
| PINCH ROLLER | DISENG | DISENG | ENG | ENG |
| REEL MOTORS | OFF | OFF | OFF | ON |
| TAPE GUIDES | RET | EXT | EXT | EXT |
| CYLINDER | OFF | ON | ON | ON |
| TAPE TENSION | NONE | LOW | LOW | HIGH |

DISENG = DISENGAGED
ENG = ENGAGED
EXT = EXTENDED
RET = RETRACTED

The foregoing table indicates that in the loaded mode the capstan motor can be on or off, depending on whether the tape is being driven by the capstan. The engagement of the pinch roller is not dependent on whether the capstan motor is on or off.

The foregoing modes are implemented with standard operations of the mode change motor and mode change mechanism utilized in DAT drives, together with additional logic functions, for example, for turning off the tape reel motors. It should be noted that changes to and from the STOP and UNLOADED modes require actuation to the mode change motor, which incurs time delay as well as mechanism wear. It should also be noted that in the LOADED mode, tape tension is high, which causes maximum wear to the tape heads and the tape.

Briefly, in accordance with the invention, the modes of operation are utilized in a manner that reduces tape and head wear as well as tape mechanism wear, and protects data that was just recorded or is next in sequence to be read while maintaining a high level of access performance.

Figure 3:
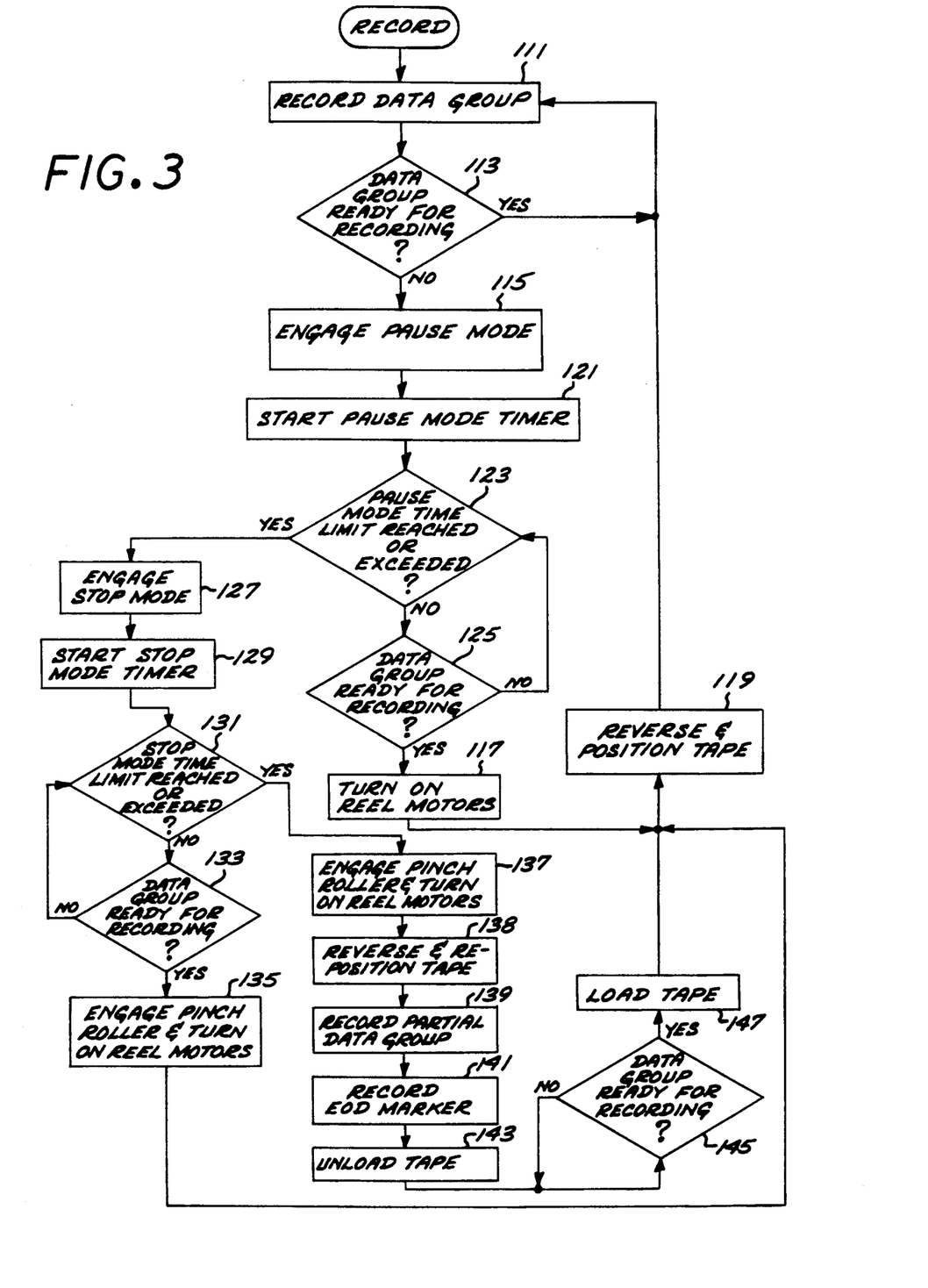
FIG. 3 is a flow diagram of an illustrative example of a record process in accordance with the invention.

Referring now to FIG. 3, shown therein is an illustrative example of a record process in accordance with the invention. For ease of understanding, this process does not address the procedure for terminating the record process, for example, when all selected computer data has been recorded. Persons skilled in the art will appreciate that such record termination process is readily implemented in the disclosed record process, for example, pursuant to known techniques.

At the start of recording, which can be at any location on the tape as determined by the particular data transfer application, the data buffer has at least one data group available for recording. At 111 a data group is recorded, and at 113 a determination is made as to whether the next data group is ready for recording. The determination at 113 can be made while a data group is being recorded, so that recording can continue without always stopping and repositioning the tape after a particular data group is recorded. If the determination at 113 is yes, the next available data group is recorded at 111.

If the determination at 113 is no, a data group is not ready for recording, the PAUSE mode is engaged at 115, which releases the tension on the tape (since the reel motors are turned off) and positions the tape so that the tapes heads contact an area on the tape that is ahead of the data that was just recorded. Such positioning results from the tape mechanism inertia which prevents the tape from being stopped instantly after recording a data group pursuant to 111.

At 121 a PAUSE timer (e.g., a counter) is started to track the length of time the drive is in the PAUSE mode pursuant to 115. At 123 a determination is made as to whether the PAUSE mode time has reached or exceeded a predetermined PAUSE mode limit, for example, 30 seconds. If no, a determination is made at 125 as to whether a data group is ready for recording. If a data group is not ready, processing returns to the determination at 123.

If the determination at 125 is yes, a data group is ready for recording, the tape reel motors are turned on at 117. At 119 the tape is reversed and positioned for recording, and control then transfers to 111, discussed above, for recording the next data group.

If the determination at 123 is yes, the PAUSE MODE time has reached or exceeded the predetermined PAUSE mode time limit, the STOP mode is engaged at 127, which causes the pinch roller to be disengaged in addition to the reel motors having been turned off pursuant to the PAUSE mode. At 129 a STOP mode timer (e.g., a counter) is started to track the length of time the drive is in the STOP mode pursuant to 127.

At 131 a determination is made as to whether the STOP mode time has reached or exceeded a predetermined STOP mode limit, for example, 1 minute. If no, a determination is made at 133 as to whether a data group is ready for recording. If a data group is not ready, processing returns to the determination at 131.

If the determination at 133 is yes, a data group is ready for recording, the pinch roller is engaged and the reel motors are turned on at 135. Control continues at 119, discussed above, so that so that the tape can be reversed and positioned for recording pursuant 111.

If the determination at 131 is yes, the STOP mode time has reached or exceeded the predetermined STOP mode limit, the pinch roller is engaged and the reel motors are turned on at 137. At 139 any partial data group in the buffer is recorded, for example, by recording a complete group that is padded with null data, and at 141 an End Of Data marker is recorded. The tape is then unloaded at 143. This reduces the possibility of data loss, for example, if power is removed.

At 145 a determination is made as to whether a data group is ready for recording. If no, the determination is repeated. If the determination at 145 is yes, a data group is ready, the tape is loaded at 147, and control transfers to 119, discussed above, so that the tape can be reversed and positioned for recording pursuant to 111. If the ready data group is a completed version of the partial data group previously recorded, the partial data group may be overwritten.

In the foregoing process, the PAUSE mode, which produces less tape tension than the LOADED mode, is utilized to avoid head contact with a tape area containing recorded data but incurs moderate head and tape wear in exchange for being able to quickly position the tape for recording. The STOP mode is utilized to avoid head contact with a tape area containing recorded data and also to reduce head and tape wear, but at some expense in terms increased time required to position the tape for recording due to the mechanical mode change required. The STOP mode also prevents tape creasing that would result from the tape being pressed against the capstan by the pinch roller for an excessive amount of time. The UNLOADED mode is utilized to completely avoid head and tape contact, at the expense of increased mechanical wear and increased time to change to the LOADED mode. In the UNLOADED mode the capstan motor is off, which extends its useful life.

It should be noted that since the tape heads traverse an area that is ahead of recorded data during the PAUSE and STOP modes, any tape wear damage due to such modes will be detected pursuant to a read-after-write check, which can be implemented in accordance with the ANSI DDS standard. Pursuant to read-after-write checks, rewrites are performed until an undamaged recording area is reached.

Figure 4:
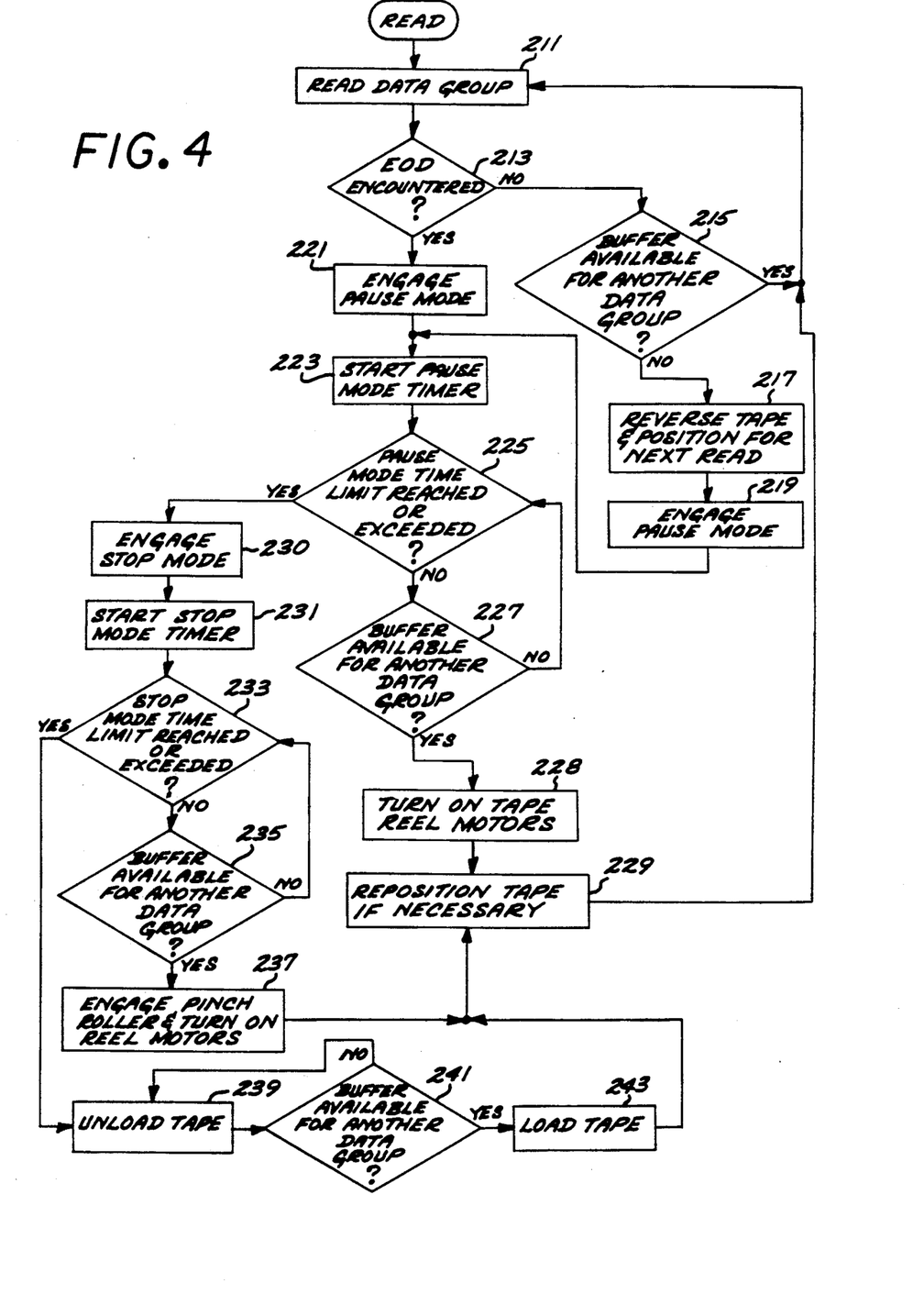
FIG. 4 is a flow diagram of an illustrative example of a read process in accordance with the invention.

Referring now to FIG. 4, shown therein is an illustrative example of a read process in accordance with the invention. For ease of understanding, this process does not address the procedure for terminating the read process, for example, when all selected data groups have been read. Persons skilled in the art will appreciate that such read termination process is readily incorporated in the subject read process, for example, pursuant to known techniques.

At the start of reading, the data buffer has sufficient memory for accepting a complete data group, and the tape is positioned for reading. At 211 a data group is read into the data buffer. It should be appreciated that if an End of Data marker is encountered, the tape will be stopped as in known tape reading processes. At 215 a determination is made as to whether an End of Data marker was encountered at 211. If no, at 125 a determination is made as to whether another data group can be read into the data buffer, which can occur while a data group is being read pursuant to 211. If yes, control continues at 211 to record the next data group. It should be appreciated that with the foregoing steps data groups are read continuously in sequence so long as the data buffer is capable of accepting complete data groups and so long as an End of Data Marker is not encountered.

If the determination at 215 is no, another data group cannot be read into the drive buffer, the tape is reversed and positioned for the next data group at 217. Then, the PAUSE mode is engaged at 219, so that the tape heads are contacting a tape area that includes data that was just read. Control then transfers to 223.

If the determination at 213 is yes, an End of Data marker was encountered, the PAUSE mode is engaged at 221, in which case the tape heads will be contacting a tape area that includes a portion of the End of Data marker, which typically spans a relatively large area of tape. This minimizes wear to the recorded tape data area.

At 223 the PAUSE timer is started to track the length of time the drive in in the PAUSE mode. At 225 a determination is made as to whether the PAUSE time has reached or exceeded a predetermined PAUSE mode time limit, for example, 30 seconds. If no, a determination is made at 227 as to whether another data group can be read into the data buffer. If a data group cannot be read into the data buffer, processing returns to the determination at 225.

If the determination at 227 is yes, the tape reel motors are turned on at 228. At 229 the tape is appropriately positioned if necessary, for example, after an End of Data marker was encountered and a read location has been specified, and control transfers to 211 to read the next data group.

If the determination at 225 is yes, the predetermined PAUSE mode time limit has been reached or exceeded, the STOP mode of operation is engaged at 229. At 231 a stop mode timer is started to track the length of time the drive is in the STOP mode. A determination is made at 233 as to whether the STOP mode time has reached or exceeded a predetermined STOP mode limit, for example, 1 minute. If no, a determination is made at 235 as to whether another data group can be read into the data buffer. If no, processing returns to the determination at 233.

If the determination at 235 is yes, more data can be read into the data buffer, the pinch roller is engaged and the tape reel motors are turned on at 237. Then, the tape is appropriately positioned if necessary at 229, discussed above, for reading pursuant to 211.

If the determination at 233 is yes, the predetermined STOP mode limit has been reached or exceeded, the tape is unloaded at 239. At 241 a determination is made as to whether more data can be read into the data buffer. If no, the determination is repeated. If yes, more data can be read into the data buffer, the tape is loaded at 243, and the tape is appropriate positioned if necessary at 229, discussed above, for reading pursuant to 211.

In the foregoing read process, the PAUSE mode, which produces less tape tension than the LOADED mode, is utilized in the read process to avoid head contact with a tape area containing data that could be read next, but incurs moderate head and tape wear in exchange for being able to quickly read the next data group on the tape. The STOP mode is utilized to avoid head contact with a tape area containing data that could be read next, and also to reduce head and tape wear, but at some expense in terms increased time required to begin reading the tape. The STOP mode also prevents tape creasing that would result from the being pressed against the capstan by the pinch roller for an excessive amount of time. The UNLOAD mode is utilized to completely avoid head and tape contact, at the expense of increased mechanical wear and increased time to change to the READ mode.

The foregoing has been a disclosure of access techniques for helical scan tape technology drives which advantageously reduces tape and head wear as well as tape mechanism wear, protects data that was just read or is next in sequence to be read, and maintains a high level of access performance.

Although the foregoing has been a description and illustration of specific embodiments of the invention, various modifications and changes thereto can be made by persons skilled in the art without departing from the scope and spirit of the invention as defined by the following claims.

What is claimed is:

1. In a DAT drive system having a capstan, a pinch roller, tape reel motors, and a rotating head cylinder having a plurality of tape heads, and wherein data to be recorded to is buffered prior to recording, a method for recording data groups and protecting the tape and the drive mechanism comprising the steps of:
   (a) determining whether a complete buffered data group is available for recording to tape;
   (b) if a complete buffered data group is available, recording the data group to tape and then continuing with step (a);
   (c) if no complete buffered data group is available, engaging a PAUSE mode wherein the tape reel motors are turned off to release tension on the tape and to stationarily position the tape so that the tape heads traverse an area of the tape that is ahead of the area on which a data group was just recorded.

2. The method of claim 1 further including the steps of:
   (d) measuring the time interval during which the PAUSE mode is engaged relative to a predetermined PAUSE mode time limit;
   (e) if a complete buffered data group becomes available for recording to tape before the PAUSE mode interval reaches the predetermined PAUSE mode time limit, recording such buffered data group and then continuing with step (a);
   (f) if a complete buffered data group does not become available for recording before the PAUSE mode interval reaches the predetermined PAUSE time mode limit, engaging a STOP mode of operation wherein the tape reel motors remain turned off and the pinch roller is disengaged from the tape and capstan.

3. The method of claim 2 further including the steps of:
   (g) measuring the time interval during which the STOP mode is engaged relative to a predetermined STOP mode time limit;
   (h) if a complete buffered data group becomes available for recording before the STOP mode interval reaches the predetermined STOP mode time limit, recording the data group to tape and continuing with step (a); and
   (i) if a complete buffered data group does not become available for recording before the STOP mode interval reaches the STOP mode time limit, recording any partial buffered data group and recording an End of Data marker.

4. The method of claim 3 further including the step of (j) unloading the tape after the step of recording an End of Data marker.

5. In a DAT drive system having a capstan, a pinch roller, tape reel motors, and a rotating head cylinder having a plurality of tape heads, and wherein only complete data groups read from tape are buffered, a method for reading data groups from tape and protecting the tape and the drive mechanism comprising the steps of:
   (a) determining whether a data group from the tape can be buffered;
   (b) if a data group can be buffered, reading a data group from the tape and continuing with step (a);
   (c) if a complete data group cannot be buffered, positioning the tape for reading the next group whereby the tape heads traverse an area on the tape that is behind the area that contains the data group next in sequence to be read and engaging a PAUSE mode wherein the tape reel motors are turned off to release tension on the tape.

6. The method of claim 5 further including the steps of:
   (d) measuring the time interval during which the PAUSE mode is engaged relative to a predetermined PAUSE mode time limit; and
   (e) if a data group can be buffered before the PAUSE interval reaches the predetermined PAUSE mode time limit, reading a data group from tape and continuing with step (a); and (f) if a data group cannot be buffered before the PAUSE interval reaches the predetermined PAUSE mode time limit, engaging a STOP mode of operation wherein the tape reel motors remain turned off and the pinch roller is disengaged from the tape and capstan.

7. The method of claim 6 further including the steps of:
   (g) measuring the time interval during which the STOP mode is engaged relative to a predetermined STOP mode time limit;
   (h) if a data group can be buffered before the PAUSE mode interval reaches the predetermined PAUSE mode time limit, reading a data group from tape and continuing with step (a); and
   (i) if a data group cannot be buffered before the STOP mode interval reaches the STOP mode time limit, unloading the tape.

8. In a DAT drive having a capstan, a pinch roller, tape reel motors, and a rotating head cylinder having a plurality of tape heads, and wherein only a complete data group is transferred to tape for recording a complete data group is transferred from tape only when the drive is capable of buffering a complete data group read from tape, a method for protecting the tape and the drive mechanism comprising the steps of:
   (a) determining whether transfer of a complete data group can be made;
   (b) if transfer of a complete data group can be made, transferring the complete group and continuing with step (a);
   (c) if transfer of a complete data group cannot be made, engaging a PAUSE mode wherein (2) the tape reel motors are turned off, and (b) the tape is stationarily positioned at a location on the tape that depends on whether the data transfer is for recording or pursuant to reading;
   (d) measuring the time interval during which the PAUSE mode is engaged relative to a predetermined PAUSE mode time limit;
   (e) if transfer of a complete data group can be made before the PAUSE mode interval reaches the predetermined PAUSE mode time limit, transferring the complete data group and continuing with step (a);
   (f) if the PAUSE mode interval reaches the predetermined PAUSE mode limit, engaging a STOP mode of operation wherein the tape reel motors remain turned off and the pinch roller is disengaged from the tape and capstan;
   (g) measuring the time interval during which the STOP mode is engaged relative to a predetermined STOP mode time limit;
   (h) if transfer of a complete data group can be made before the STOP mode interval reaches the predetermined STOP mode time limit, transferring the complete group and continuing with the step (a);
   (i) if the STOP mode interval reaches the STOP mode time limit, transferring any buffered partial data group for recording and recording an End of Data marker; and
unloading the tape.

* * * * *